United States Patent
Ellison et al.

(10) Patent No.: US 9,106,629 B2
(45) Date of Patent: Aug. 11, 2015

(54) DISTRIBUTED ALGORITHM FOR CHANGING A SHARED VALUE

(75) Inventors: Carl M. Ellison, Medina, WA (US); Larry Zhu, Redmond, WA (US); Tore L. Sundelin, Duvall, WA (US); Gleb Kholodov, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1000 days.

(21) Appl. No.: 12/543,326

(22) Filed: Aug. 18, 2009

(65) Prior Publication Data
US 2011/0047202 A1 Feb. 24, 2011

(51) Int. Cl.
*G06F 15/16* (2006.01)
*H04L 29/06* (2006.01)
*G06F 21/40* (2013.01)
*H04L 9/08* (2006.01)
*H04L 29/08* (2006.01)

(52) U.S. Cl.
CPC .............. *H04L 63/061* (2013.01); *G06F 21/40* (2013.01); *H04L 9/0869* (2013.01); *H04L 9/0891* (2013.01); *H04L 63/083* (2013.01); *H04L 67/10* (2013.01)

(58) Field of Classification Search
CPC ..... H04L 9/0833; H04L 63/06; H04L 63/065; H04L 9/08; H04L 9/0838
USPC ................... 709/201, 205, 228, 248; 713/171
See application file for complete search history.

(56) References Cited

U.S. PATENT DOCUMENTS

| 8,448,719 B2 * | 5/2013 | Furukawa | 173/171 |
| 2002/0046359 A1 | 4/2002 | Boden | 714/6 |
| 2007/0214355 A1 | 9/2007 | Lamport | 713/156 |
| 2008/0165974 A1 * | 7/2008 | Inoue et al. | 380/279 |
| 2010/0180116 A1 * | 7/2010 | Coan et al. | 713/168 |

OTHER PUBLICATIONS

Kim et al. "Simple and Fault-Tolerant Key Agreement for Dynamic Collaborative Groups" ACM, CCS '00, New York, 2000, p. 235-244.*
Steiner et al. "Key Agreement in Dynamic Peer Groups" IEEE Transactions on Parallel and Distributed Systems, vol. 11, No. 8, Aug. 200. p. 769-780.*
Lamport, L.; "*Paxos Made Simple*"; Nov. 1, 2001; 14 Pgs.
De Prisco, et al.; "*Revisting the Paxos Algorithm*" (Compressed Postscript); Proceedings of $11^{th}$ International Workshop on Distributed Algorithms (WDAG'97, Saarbrucken, Germany); Sep. 1997; 1 Pg.
Ma, et al.; "*Password-based Dynamic Group Key Agreement*"; 2007 IFIP International Conference on Network and Parallel Comuting—Workshops; Institute of Software of Chinese Academy of Sciences, Beijin, China; 2007 IEEE; 6 Pgs.

(Continued)

*Primary Examiner* — David Lazaro
(74) *Attorney, Agent, or Firm* — Sunah Lee; Kate Drakos; Micky Minhas (57) ABSTRACT

Each member of a group contributes to and calculates a new shared value. A distributed shared value algorithm is used to reach unanimous agreement on a shared value, such that every group member can use the new shared value as soon as it is changed. The distributed shared value agreement methodology operates without the selection of a leader. Each group member performs the distributed shared value agreement methodology and computes the new shared value using one or more of the contributions from the group members in such a way that no one member coerces the resulting shared value.

20 Claims, 4 Drawing Sheets

(56) References Cited

OTHER PUBLICATIONS

Dutta, R.; "*Converting Group Key Agreement Protocol into Password-Based Setting—Case Study*"; Cryptography and Security Department, Institute for Infocomm Research, Singapore; Journal of Computers, vol. 2, No. 8; Oct. 2007; 8 Pgs.

"*Consensus Protocols: Two-Phase Commit—Paper Trail*"; http://hnr.dnsalias.net/wordpress/2008/11/consensus-protocols-two-phase-commit/; Nov. 27, 2008; 8 Pgs.

Guerraoui, et al.; "*Consensus Service: A Modular Approach for Building Agreement Protocols in Distributed Systems*"; Ecole Polytechnique Federale de Lausanne; 1996 IEEE; 10 Pgs.

\* cited by examiner

DISTRIBUTED ALGORITHM FOR CHANGING A SHARED VALUE

BACKGROUND

In many distributed systems there are multiple autonomous entities that cooperate to achieve a result. Occasionally, they need to agree among themselves on a course of action. One such instance is in when it comes time to change a password. There are standard protocols, e.g., PAXOS, for achieving distributed agreement among entities. Some of these protocols involve the selection of a leader that is empowered to propose and then make a change for the whole group. There are also standard distributed agreement algorithms that call for selection of the most recent change when there are competing changes. These algorithms generally use either a synchronized clock or a generalized notion of a distributed sequence.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A distributed agreement algorithm is performed by a group to reach unanimous agreement on a shared value. Each member of the group contributes to and calculates a new shared value without the selection of a leader. The new shared value is calculated using one or more of the contributions from the group members in such a way that no one member coerces the resulting shared value.

DETAILED DESCRIPTION

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Figure 1:
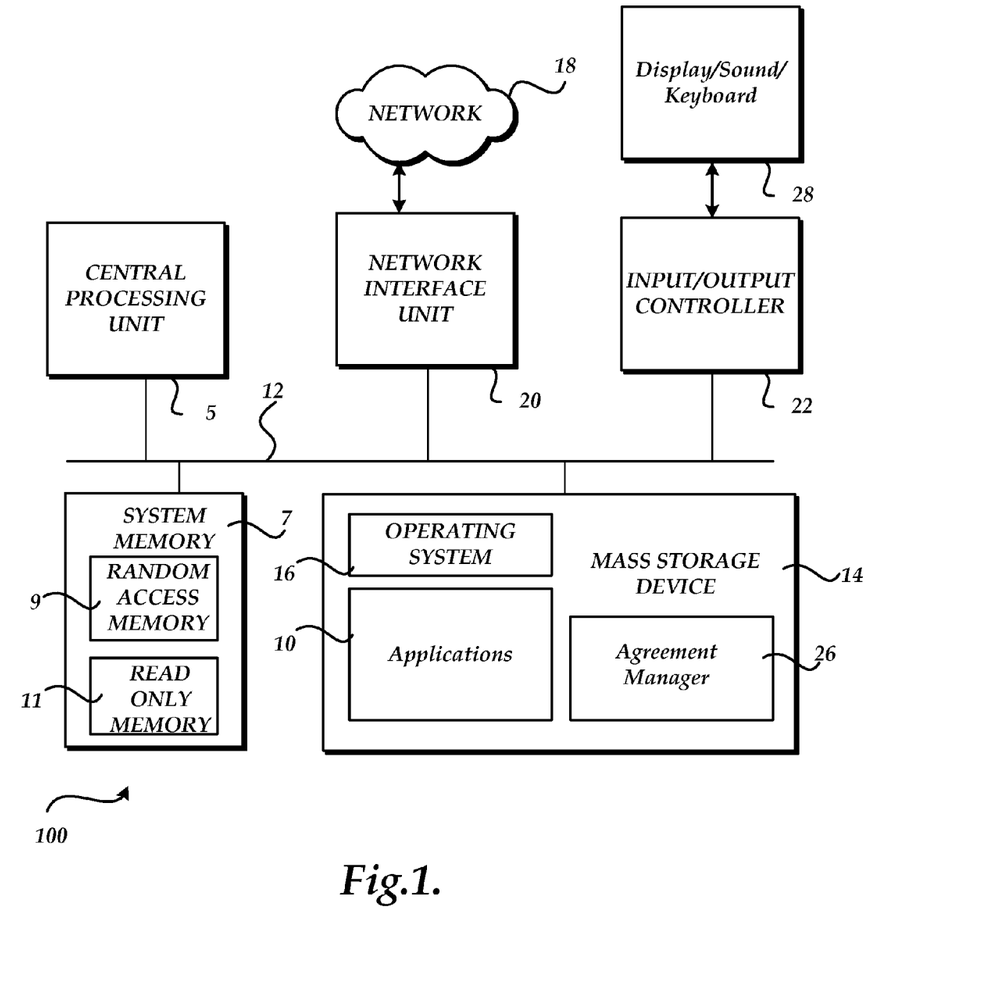
FIG. 1 illustrates a computer architecture for a computer.

Referring now to FIG. 1, an illustrative computer architecture for a computer 100 utilized in the various embodiments will be described. The computer architecture shown in FIG. 1 may be configured as a desktop, a server, or mobile computer and includes a central processing unit 5 ("CPU"), a system memory 7, including a random access memory 9 ("RAM") and a read-only memory ("ROM") 10, and a system bus 12 that couples the memory to the CPU 5. A basic input/output system containing the basic routines that help to transfer information between elements within the computer, such as during startup, is stored in the ROM 10. The computer 100 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage mediums and communication media. Computer storage mediums includes volatile and non-volatile, removable and non-removable media implemented in any method or technology for storage of information such as computer-readable instructions, data structures, program modules or other data. Computer storage mediums include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide output to a display screen that includes a user interface 28, a printer, or other type of output device. User interface (UI) 28 is designed to provide a user with a visual way to interact with applications 10, as well as to interact with other functionality that is included on computing device 100 or some other coupled computing device.

As mentioned briefly above, a number of program modules and data files may be stored in the mass storage device 14 and RAM 9 of the computer 100, including an operating system 16 suitable for controlling the operation of a networked computer, such as the WINDOWS 7® operating system from MICROSOFT CORPORATION of Redmond, Wash. The mass storage device 14 and RAM 9 may also store one or more program modules. In particular, the mass storage device 14 and the RAM 9 may store one or more application programs. One of more of the applications may be an application that requires a password to access functionality.

Agreement manager 26 provides functionality for creating a new shared value that is associated with a group of members. Generally, agreement manager 26 is configured to generate a new group shared value, such as a password, shared secret, or some other shared value between the group members. According to one embodiment, each group member within a group includes an agreement manager 26 that executes a distributed shared value algorithm. The distributed shared value algorithm operates without selecting a leader. Instead, each group member utilizes agreement manager 26 to perform the distributed shared value agreement method and computes the new shared value using one or more of the contributions from the group members of the collaboration in such a way that no one member coerces the resulting shared value. The methodology is also designed to tolerate changes in group membership while the shared value is in the process of being changed. More detail on operation of agreement manager 26 is provided below. A shared value change is implemented after each group member of the collaboration knows and agrees to the change. More detail on the operation of agreement manager 26 is provided below.

Figure 2:
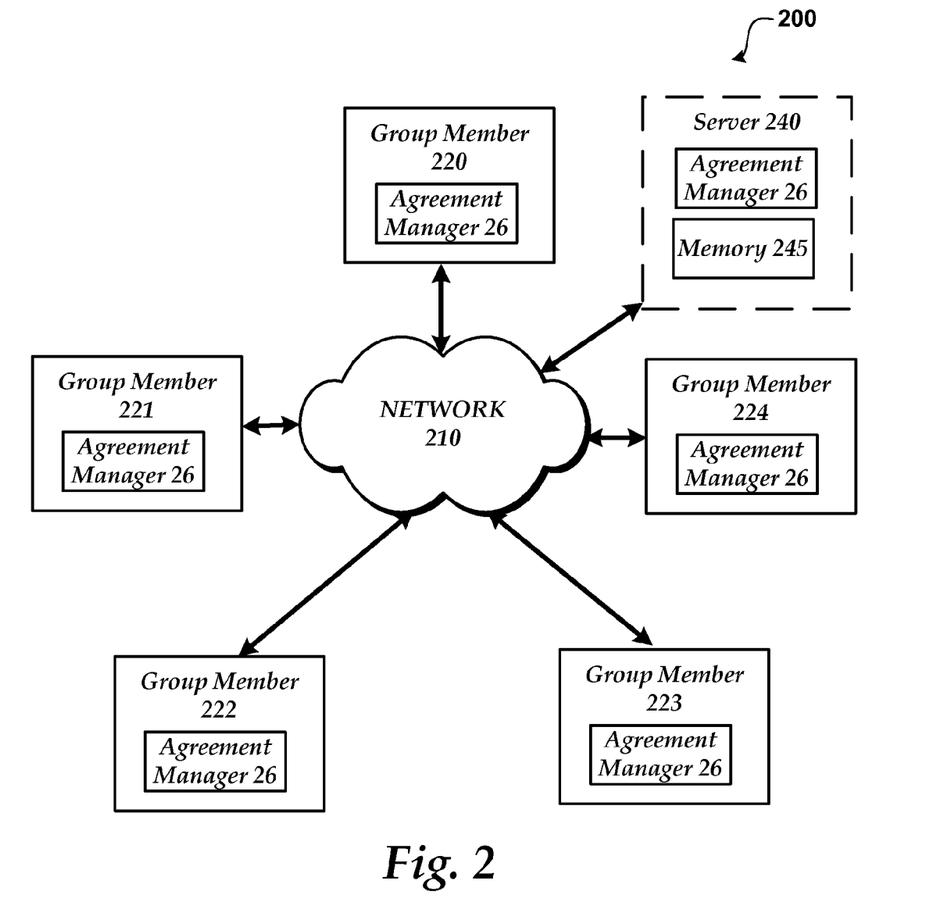
FIG. 2 shows a system for changing a shared value for a group.

FIG. 2 shows a system for changing a shared value for a group. As illustrated, system 200 includes group members 220-224 and optional server 240 coupled through network 210. Agreement manager 26 may be implemented within each group member as shown in FIG. 2 or may be implemented externally from the group members within a server, such as server 240.

While FIG. 2 shows a group having 5 group members, the group may consist of any number of group members. Additionally, members of the group can change before, during or after changing the shared value. When a group is changing membership during the creation of a new shared value, the group membership change takes precedence and causes either the change to the shared value to stop, or causes a pause in the shared value creation process.

In the current example, each group member (220-224) is considered a collaborator to the shared value change. Each member (220-224) is able to determine the other members of the group. For example, each member may maintain a current list of the members within the group and/or may access a server (i.e. server 240) to determine the group members. Generally, each member of the group can be identified by an identifier that is appropriate for the distributed environment. For instance, the member IDs may be public keys or other IDs that are not dependent on any central administration and naming. In a centrally administered environment, these IDs could be assigned names, such as domain name system (DNS) names. According to one embodiment, a group memory 245 comprising the group IDs, as well as other information relating to the group, is stored at a networked location, such as server 240. Alternatively, each group member may maintain a copy of the group memory. When there is more than one copy of the group memory, each member is configured to synchronize the contents of the group memory as connectivity allows.

Agreement manager 26 is configured to create a data structure that is used in generating the new shared value. According to one embodiment, when agreement manager 26 executes on each member device, then the data structure is stored on the computing device of each group member. Alternatively, the data structure may be stored at a central location, such as memory 245 of server 240. The data structure is accessed during the execution of the distributed algorithm and stores information relating to the contributions and the state of each of the group members. According to one embodiment, the data structure includes: (1) a date and time when the new shared value should be in place; (2) a date and time when agreement on the new shared value should start (this value takes into account the time to propagate changes to each of the group members); (3) an ID of the group performing this agreement, such that when group membership changes occur the group ID changes; and (4) an array, with one entry in the array for each group member in the collaboration for changing the shared value.

Each entry in the array includes: (1) a member ID for the group member at that index; (2) a proposed shared value seed value (set to zero when no seed value is placed); a randomly generated sequencing value for the proposed shared value seed value; and (3) a state variable that indicates a state for changing the shared value.

The state variable includes the following states: (1) no proposed shared value seed value yet; (2) proposed seed value entered; (3) this member has seen proposed seed values from all members in the collaboration and agrees to the newest shared value; (4) this member has seen all other members report state 3 or 4, and is therefore ready to delete the working data structure.

As mentioned above, agreement manager 26 is configured to create a data structure for each new shared value change cycle. Initially, agreement manager 26 initializes the data structure such that all contributions are set to zero (0) and all state variables are set to one (1). As the data structures from the group members are synchronized between each of the group members, any contributions from other group members are merged into the receiving member's data structure. After a period of time, the data structure for each member is completed. During the synchronization of the data structures between the members, a higher state variable supplants a lower value for a state variable and a non-zero shared value seed or sequencing value replaces a zero value.

The data structures for creating a new shared value have a limited lifetime. They are created when a new shared value is to be created and are destroyed by any group member that determines that all of the members report this data structure is in state four (state four represents that the member has seen all of the members report state 3 or 4, and is therefore ready to delete the working data structure). A member that has reported state 4 for a data structure does not attempt to propagate it to other nodes during synchronization.

As discussed above, each group member executes the distributed shared value algorithm using agreement manager 26. Initially, when the member is in state 1, the member generates a shared value seed value and a sequencing value. These generated values are placed into the member's data structure by agreement manager 26 and then the member changes its current state from 1 to 2 indicating that the proposed shared value seed value has been entered into the data structure. These entered values are then synchronized to other group members.

When a group member examines the data structure that has been synchronized and determines that all other members are either in state 2 or 3, then the member changes its state to 3 indicating that it has seen the proposed seed values from all of the other members in the collaboration. Once the array of new shared value seed values has been completed it is known that each member of the group has made their contribution. When the member determines that all of the contributions have been made it computes the new shared value with its sequence number. Each member computes the new shared value independently from the other group members.

The new shared value may be computed using all or some of the contributions from each of the group members. For example, each member could select the contribution with the maximum sequencing value or compute the hash of all contributions in data structure order and use that as the shared value seed value. The calculation of the shared value could also mix different contributions from each of the members of the collaboration. If the new shared value requires more bits of randomness than the seed alone provides then the chosen seed value is used to seed a pseudo-random number generator. Given enough bits for the shared value, a shared value is generated having the required length and character set. These requirements vary depending on how the shared value or other key is to be used. All members use the same method to calculate the new shared value using the same contributions of the group members. Since each group member calculates the same new shared value, synchronization for the shared value is not necessary, although the shared value can be synchronized.

When a member changes its current state to 4 indicating that this member has seen all members report that they have seen all proposed seed values and agree to the newest shared value, it calculates the new shared value and checks to see if it can authenticate the new shared value (implying that some other member has already changed the shared value). If the authentication fails, then the member engages in a change-shared value operation with the entity, authenticating with a previously calculated shared value. According to one embodiment, a copy of previous shared values used is maintained by each group member or are stored in another data store, such as memory 245. The previous shared values are maintained in case the entity to which a member is using the shared value has not been updated with the new shared value. In this case, a previous shared value may need to be used until the entity is updated with the new shared value. When a group member authenticates with a shared value, it tries the current shared value first, then the previous shared value, and so on down the list until successful.

According to another embodiment, a set of shared values is generated. Instead of a single shared value at each sequence number, a set of shared values is generated, each labeled by the members that generated that shared value. In this embodiment, any shared value that has a majority of members is used. When this version of the shared value method is used, a change-shared value operation is not performed until a majority of group members report the same computed shared value.

Figure 3:
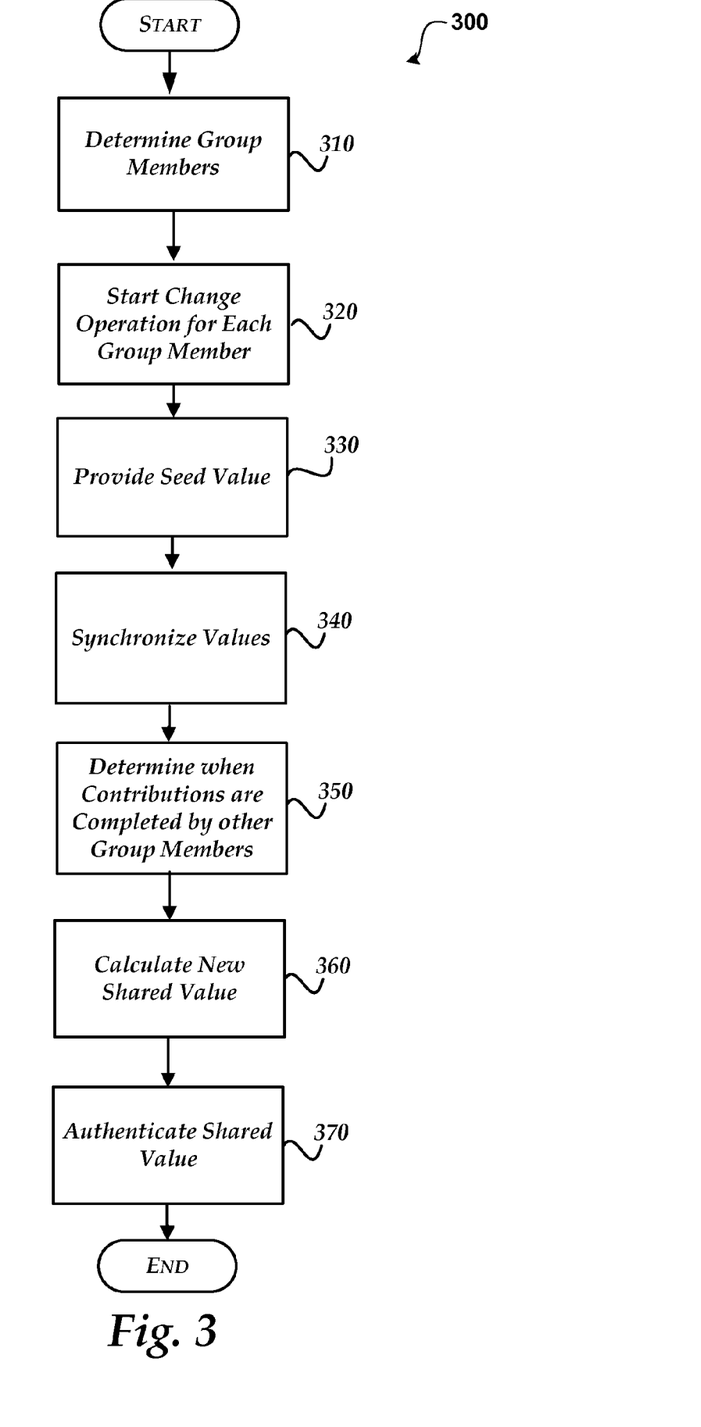
FIG. 3 illustrates changing a shared value using a distributed algorithm.
Figure 4:
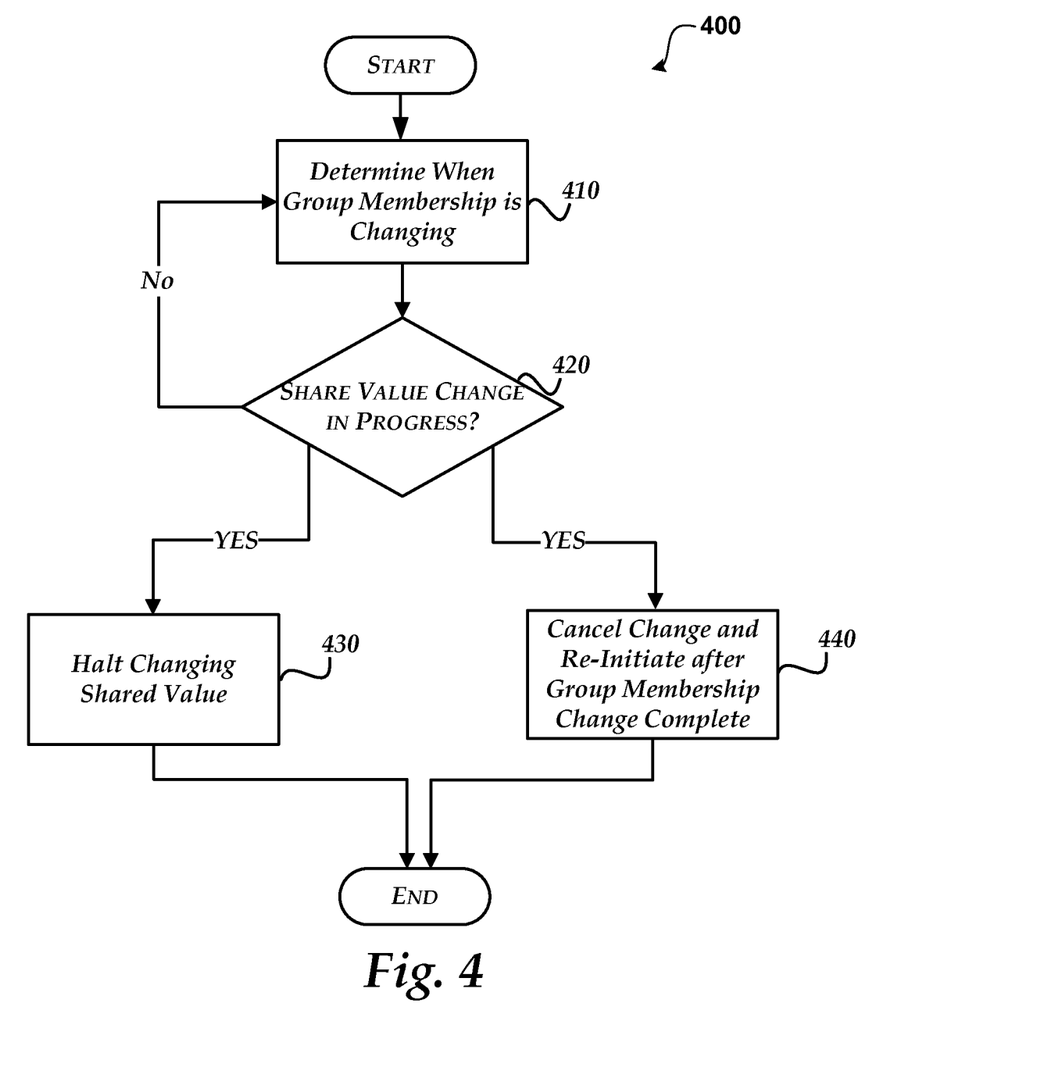
FIG. 4 shows changing group membership during calculation of a new shared value.

Referring now to FIGS. 3-4, an illustrative processes relating to changing a group shared value is described.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 3 illustrates changing a shared value using a distributed methodology.

After a start operation, the process flows to operation 310, where the members for the group are determined. The members of the group may be determined in different ways. For example, a list of group members may be maintained in a central store and/or each member of a group may maintain a list of the group members.

Moving to operation 320, the shared value change operation is started for each group member. Each group member is configured to execute the distributed shared value change algorithm and calculate the new shared value when all of the contributions from the group members are received. When the shared value change operation is started, each group member initializes its data structure(s) that are used to store information relating to changing the shared value. As discussed above, the data structure includes a proposed shared value seed value; a randomly generated sequencing value for the proposed shared value seed value; and a state variable that indicates a state for changing the shared value.

Flowing to operation 330, each group member individually contributes to the creation of the new shared value by generating a shared value seed value and a sequencing value. These generated values are placed into the data structure that is associated with the group member.

Transitioning to operation 340, the values created by each group member are synchronized with the other group members. According to one embodiment, the synchronization occurs as resources are available for synchronization. Other methods of synchronization may also be used. For example, predetermined times may be set to synchronize the generated values from each group member and/or a synchronization operation may start whenever a change is made to the data structure on a member.

Flowing to operation 350, each group member determines when the contributions have been received by each of the other group members. According to one embodiment, this occurs when the data structure that is associated with the member includes all of the contributions from the other group members.

Moving to operation 360, the new shared value is calculated. According to one embodiment, each group member calculates the new shared value using the contributions from the group members. The new shared value may be computed using all or some of the contributions from each of the group members. For example, each member could select the contribution with the maximum sequencing value or compute the hash of all contributions in data structure order and use that as the shared value seed value. The calculation of the shared value could also mix different contributions from each of the members of the collaboration. Generally, as long as each group member uses the same method and contributions in the calculation of the new shared value, the same shared value will be calculated by each of the members.

Transition to operation 370, the shared value is attempted to be authenticated. If the authentication fails, then the member engages in a change-shared value operation with the entity, authenticating with a previously calculated shared value. According to one embodiment, a copy of previous shared values used is maintained by each group member. The previous shared values are maintained in case the entity to which a member is using the shared value has not been updated with the new shared value. In this case, a previous shared value may need to be used until the entity is updated with the new shared value. When a group member authenticates with a shared value, it tries the current shared value first, then the previous shared value, and so on down the list until successful The process then flows to an end operation and returns to processing other actions.

FIG. 4 shows changing group membership during calculation of a new shared value.

After a start operation, the process flows to operation 410, where a determination is made that a membership of a group is changing. For example, a member may be removed from the group, a member may be added to the group and characteristics relating to the members may change within the group.

Moving to decision operation 420, a determination is made as to whether a shared value change is in progress. When a shared value change is not in progress, the process returns to operation 410. When a shared value change is in progress, the process flows to either operation 430 or operation 440.

At operation 430, the shared value change is halted during the group change. In this example, the data structure that is associated with each member is updated when the change to the group is complete. Once the data structures are updated, the shared value change operation may resume using the new group information.

At operation 440, the shared value change operation is canceled when a group change is detected. The shared value change operation is then re-initiated when the group membership change is completed.

The process then flows to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method comprising:
   determining each member computing device of a group to calculate a shared value used to enable access to functionality by each member computing device;
   initiating calculating the shared value for the group, wherein one or more member computing devices contributes to the creation of the shared value; and
   causing each member computing device of the group to:
      execute a distributed shared value algorithm;
      determine if one or more member computing devices of the group has generated a contribution;
      calculate the shared value using only a portion of contributions from the group; and
      store information relating to the contribution of each member computing device and a state variable using a data structure wherein the state variable indicates a state for changing the shared value for each member computing device.

2. The method of claim 1, further comprising generating the data structure to include:
   a date and time information about when a new shared value is to be in place;
   a date and time information about when agreement on the new shared value starts;
   an identifier of the group associated with the agreement; and
   an array that includes an entry for each group member for changing the shared value.

3. The method of claim 1, further comprising determining if membership of the group is changing and in response to the change delaying changing the shared value until the change in the membership of the group is complete.

4. The method of claim 1, further comprising allowing a group membership change to take precedence during changing of the shared value to tolerate changes in the group membership while the shared value is in the process of being changed; and
   in response to the change, stopping the change of the shared value and re-initiating the process of changing the shared value after the group membership change is complete.

5. The method of claim 1, wherein calculating the shared value comprises selecting at least one of a shared value seed value and a sequencing value and each member computing device using the selected shared value seed value and the sequencing value to calculate the new shared value.

6. The method of claim 1, wherein calculating the shared value comprises each member computing device calculating the shared value by computing a hash of each contribution by each of the members.

7. The method of claim 1, further comprising creating the data structure for each member computing device that includes: a proposed shared value seed value; a randomly generated sequencing value for the proposed shared value seed value; and the state variable that indicates the state for changing the shared value for each member computing device.

8. The method of claim 7, further comprising synchronizing each data structure of the group.

9. A computer-readable storage medium that is not a signal having computer-executable instructions configured for:
   determining each member computing device of a group to calculate a shared value used to enable access to functionality by each member computing device;
   causing each member computing device of the group to execute a distributed shared value algorithm;
   generating a contribution to the shared value, wherein the contribution comprises a shared value seed value and a sequencing value;
   providing the contribution to each member computing device of the group;
   determining when each member computing device of the group has provided the contribution;
   calculating the shared value using a portion of the provided contributions; and
   storing information relating to the contribution of each member computing device and a state variable using a data structure wherein the state variable indicates a state for changing the shared value for each member computing device.

10. The computer-readable storage medium of claim 9, further comprising attempting to authenticate the shared value after calculating the shared value, and when the shared value is not authenticated, initiating a shared value change operation and authenticating with a previous shared value.

11. The computer-readable storage medium of claim 9, further comprising;
   determining if membership of the group is changing; and
   in response to the change, delaying changing the shared value until the change in the membership of the group is complete or stopping the change of the shared value and re-initiating the process of changing the shared value after the change in the membership of the group is complete.

12. The computer-readable storage medium of claim 9, wherein calculating the shared value comprises selecting two or more contributions and using the selected contributions to calculate the new shared value.

13. The computer-readable storage medium of claim 9, further comprising creating the data structure upon initiation of the shared value change operation that includes: a proposed shared value seed value; a randomly generated sequencing value for the proposed shared value seed value; and the state variable that indicates the state for changing the shared value for each member computing device.

14. The computer-readable storage medium of claim 13, further comprising synchronizing each data structure of the group.

15. A system comprising:
an agreement manager executing on each member computing device; and configured to perform tasks, comprising:
   determining each member computing device of a group to calculate a shared value used to enable access to functionality by each member computing device;
   causing each member computing device of the group to execute a distributed shared value algorithm;
   generating a contribution to the shared value, wherein the contribution comprises a shared value seed value and a sequencing value;
   providing the contribution to each member computing device of the group;
   determining if each member computing device of the group has provided the contribution;
   calculating the shared value using a portion of the provided contributions; and
   storing information relating to the contribution of each member computing device and a state variable using a data structure wherein the state variable indicates a state for changing the shared value for each member computing device.

16. The system of claim 15, further comprising:
attempting to authenticate the shared value after calculating the shared value; and
if the shared value is not authenticated, initiating a shared value change operation and authenticating with a previous shared value that is stored with other previous shared values.

17. The system of claim 15, further comprising:
determining if membership of the group is changing, and
in response to the change, delaying changing the shared value until the change in the membership of the group is complete or stopping the change of the shared value and re-initiating the process of changing the shared value after the change in the membership of the group is complete.

18. The system of claim 15, wherein calculating the shared value comprises selecting each of the contributions and using the selected contributions to calculate the new shared value.

19. The system of claim 15, further comprising creating the data structure upon initiation of the shared value change operation that includes: a proposed shared value seed value; a randomly generated sequencing value for the proposed shared value seed value; and the state variable that indicates the state for changing the shared value for each member computing device; wherein the data structure is removed after the shared value is calculated.

20. The system of claim 19, further comprising synchronizing each data structure of the group.

* * * * *